United States Patent
Rånby et al.

[11] Patent Number: 5,834,118
[45] Date of Patent: Nov. 10, 1998

[54] RADIATION CURABLE RESINS COMPRISING HYPERBRANCHED POLYESTERS

[75] Inventors: Bengt Rånby, Djursholm, Sweden; Shi Wenfang, Heifei Anhui, China

[73] Assignee: Neste Oy of Keilaniemi, Espoo, Finland

[21] Appl. No.: 793,611
[22] PCT Filed: Sep. 8, 1995
[86] PCT No.: PCT/SE95/01013
  § 371 Date: May 9, 1997
  § 102(e) Date: May 9, 1997
[87] PCT Pub. No.: WO96/07688
  PCT Pub. Date: Mar. 14, 1996

[30] Foreign Application Priority Data

Sep. 8, 1994 [SE] Sweden .................................. 9402994

[51] Int. Cl.[6] ............................ B32B 27/06; C08G 63/12
[52] U.S. Cl. ........................ 428/482; 528/272; 528/274; 528/283; 528/296; 528/297; 528/302; 528/306; 528/308; 525/437; 522/6; 428/480
[58] Field of Search ................................... 528/272, 274, 528/283, 296, 297, 302, 306, 308; 525/437; 522/6; 428/480, 482

[56] References Cited

U.S. PATENT DOCUMENTS 4,557,991 12/1985 Takagiwa et al. ...................... 430/109
4,558,075 12/1985 Suss et al. .............................. 523/216
5,241,019 8/1993 Otsuki et al. .......................... 525/437

FOREIGN PATENT DOCUMENTS

WO 93/17060 9/1993 WIPO .
WO 93/18079 9/1993 WIPO .

*Primary Examiner*—Samuel A. Acquah
*Attorney, Agent, or Firm*—Banner & Witcoff, Ltd.

[57] ABSTRACT

Hyperbranched polyester of a polyol with 3 to 10 reactive hydroxyl groups, preferably of equivalent reactivity, and an aromatic polycarboxylic anhydride with 2 to 4 carboxyl groups, preferably 3 carboxyl groups, each hydroxyl group of the polyol forming an ester linkage with one anhydride group of the polycarboxylic anhydride, and further glycidyl (meth)acrylate or allyl glycidyl ether forming ester linkages with the remaining carboxyl groups of the anhydride and free hydroxyl groups. Further in the hyperbranched polyester (meth)acrylic anhydride and/or an aliphatic carboxylic anhydride form ester linkages with the free hydroxyl groups. The invention also comprises a process for the production of hyperbranched polyesters and such polyesters obtainable by the process. The hyperbranched polyesters can be used as resins, curable by UV irradiation, for the production of coatings, adhesives, laminates, foils and thin films and fibre-reinforced composites.

42 Claims, 5 Drawing Sheets

Reaction scheme for the synthesis of the hyperbranched polyester.

Reaction scheme for the synthesis of the hyperbranched polyester.

IR spectra of the products at different reaction stages.

D - Polyol residue

Molecular structure of the three polyolester isomers.

Idealized formula of the hyperbranched methacrylated polyester with 8 double bonds.

Idealized formula of the hyperbranched methacrylated polyester with 16 double bonds.

Molecular mass distribution of the hyperbranched methacrylated polyester D-1 analyzed with GPC analysis.

Dynamic viscosity of the hyperbranched (meth)acrylated polyesters.

Flow time of hyperbranched polyesters and MUP using viscometric cup

Curing time and belt speed to tack-free state for UV cured polyester films

Glass transition temperatures of the cured hyperbranched polyesters.

RADIATION CURABLE RESINS COMPRISING HYPERBRANCHED POLYESTERS

The present invention relates to new hyperbranched polyesters and a process for the production thereof and curable resins comprising the polyesters.

Radiation-curable resins are increasingly used in various industrial applications, replacing conventional thermally cured and solvent based coatings and adhesives. The radiation-curable resins have favourable properties, e.g., high speed and low energy consumption of cure, solvent-free formulations, room temperature operation and high quality end-products. The principal components of a radiation-curable resin are oligomers (or prepolymers) and comonomers. The oligomers constitute the backbone of the three-dimensional polymer network formed by curing. Important types of oligomers commonly used for coating are acrylated epoxies, acrylated polyurethanes, unsaturated polyesters and acrylated polyesters (or polyethers) which give desired properties of the final cured films. However, those oligomers usually consist of linear molecular chains. The viscosity of the resin increases rapidly with increasing chain length of the oligomer. To obtain an operational viscosity of the formula for spraying, dipping, roll coating, etc., large amounts of multifunctional comonomer are required for the primary function of viscosity control. In addition, the comonomers have important effects on the cure reaction and the properties of the final product. Some of the comonomers have low cure rate, cause shrinkage of the film during curing, and have high costs and a limited shelf life. Multifunctional acrylates are the preferred monomers in radiation-curable systems because of their rapid curing rates and low prices. The common acrylate monomers are volatile and toxic, and have strong odour. Therefore, the trend is to use radiation-curable oligomers with viscosity close to the required application viscosity in order to reduce or eliminate the use of comonomers.

An object of the present invention therefore was to obtain oligomers with reduced viscosity compared to known oligomers with similar molecular weight.

A further object of the invention was to present oligomers which in resin applications needs a lower amount of multifunctional comonomers or none at all, while the resins still have a low viscosity, a high cure rate, an acceptable degree of curing and the final products have good mechanical properties.

A further object of the invention was to offer a process for the production of such oligomers.

The objects of the invention was solved by the hyperbranched polyester, the process for the production of these hyperbranched polyesters and resin comprising them, as claimed in the claims.

Figure 1:
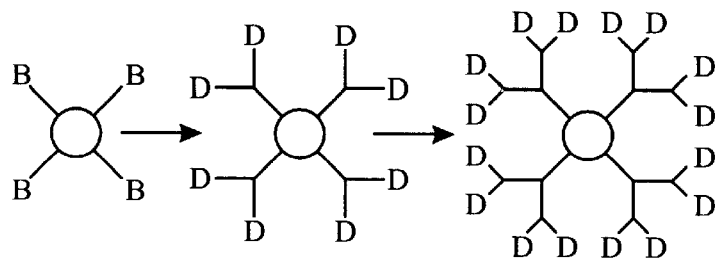
FIG. 1 depicts a reaction scheme for the synthesis of the hyperbranched polyester.

Oligomers with a strongly branched structure are a new family of polymers which has been attracting increasing interest for many applications, e.g., in agriculture, medicine, cosmetics, adhesives and coatings. The oligomers are referred to as hyperbranched polyesters with a three-dimensional molecular architecture and possessing starburst topology (D. A. O'Sullivan, Chem. Eng. News, 20 (1993); D. A. Tomalia, A. M. Naylor, and W. A. Goddard III, Angew. Chem. Int. Ed. Engl., 29, 138 (1990). An important structural difference between linear oligomers and hyperbranched polyesters is that a linear oligomer of sufficient molecular weight contains an entanglement of flexible molecular chains, while a hyperbranched polyester is a compact molecule with many branches which carry a high number of terminal functional groups on each molecule.

With the present invention it was found that hyperbranched polyesters with reactive acrylate double bonds at chain extremities can be used to reduce viscosity, increase reaction rate, and improve adhesion to substrates due to their very special molecular structures. This new kind of molecules modifies the physical and chemical properties both is of the resin system and of the final product after curing, thereby facilitating their use in coating and adhesive systems. Further, with the present invention hyperbranched polyesters with high molecular weight can be obtained in a simple process from readily available and inexpensive raw materials.

Hyperbranched polyester research is still fairly new, and to date no commercial products are available. The main difficulties in preparing three-dimensional and ordered hyperbranched polyesters are preserving the regularity and order in the structures, characterization of the products, and separating the products from the excess of reactants. Little work has been performed to prepare adhesive and coating systems with hyperbranched polyesters, especially for radiation curing applications. A series of work on allyl ether maleate hyperbranched polyesters for UV curing coatings have been reported (M. Johansson, E. Malmström, and A. Hult, J. Polym. Sci., Part A: Polym.Chem., 31, 619 (1993); E. Malmström and A. Hult "Hyperbranched polyesters and their Degree of Branching as Determined by $^{13}$C-NMR", Proceedings of Nordic Polymer Days 1994.).

With the present invention it has been possible to synthesize a series of new hyperbranched (meth)acrylated polyesters with different number of terminal double bonds per molecule. The rheological properties of the resins prepared from the polyesters and the mechanical properties of UV cured films are improved in a pronounced manner compared with known polymers.

Thus, the present invention relates to a hyperbranched polyester of a polyol with 3 to 10 reactive hydroxyl groups, preferably of equivalent reactivity, and an aromatic polycarboxylic anhydride with 2 to 4 carboxyl groups, preferably with 3 carboxyl groups, each hydroxyl group of the polyol forming an ester linkage with one anhydride group of the polycarboxylic anhydride, and further glycidyl (meth)acrylate or allyl glycidyl ether forming ester linkages with the remaining carboxyl groups of the anhydride and free hydroxyl groups.

The invention further relates to a hyperbranched polyester as defined above in which (meth)acrylic anhydride and/or an aliphatic carboxylic anhydride form/s ester linkages with the free hydroxyl groups.

The present invention further relates to a process for the production of a hyperbranched polyester, and hyperbranched polyester obtainable by the process characterized in that it comprises the following steps:

a) reacting an aromatic polycarboxylic anhydride with 2 to 4 carboxyl groups, preferably 3 carboxyl groups, with a polyol with 3 to 10 reactive hydroxyl groups, preferably of equivalent reactivity, in the presence of an activating agent, the amount of anhydride being at least one mole of anhydride per hydroxyl group in the polyol, b) reacting the product from a) with glycidyl (meth) acrylate or allyl glycidyl ether in an amount at least corresponding to one mole of glycidyl (meth)acrylate or allyl glycidyl ether per free carboxylic acid group of the product of a). The process and the polyester obtainable by the process can further comprise the following step;

c) the product from step b) is further reacted with (meth) acrylic anhydride in an amount sufficient to esterify a part or all of the free hydroxyl groups of the product from step b). The products from step b) or c) can further be reacted with an aliphatic carboxylic anhydride in an amount to esterify a part of or all of the remaining hydroxyl groups of the products.

Two principally different methods have been developed for the synthesis of hyperbranched polymers: a convergent growth approach, where growth begins at the chain ends, and a divergent growth approach, where growth begins at a central core. In the present invention, the hyperbranched polyesters with terminal double bonds were synthesized by controlled stepwise divergent preparation, i.e., the synthesis started at the centre of the hyperbranched polyester. Two or three steps were needed to obtain hyperbranched polyesters with a predetermined number of terminal double bonds located at the surface of the oligomeric sphere. The reaction scheme for the synthesis of the hyperbranched polyester can be illustrated for a polyol with 4 hydroxyl groups as shown in FIG. 1 (B is hydroxyl groups, and D is unsaturated groups). New nomenclature developed by K. L. Wooley, J. M. J. Fréchet and C. J. Hawker, Polymer vol. 35, No. 21, 1994, names the starburst hyperbranched molecule of FIG. 1 a dendritic polymer.

In the first reaction step an aromatic carboxylic anhydride with 2 to 4 carboxyl groups, preferably 3 carboxyl groups, and a polyol with 3 to 10 hydroxyl groups and an activating agent were heated to temperatures about or below 100° C., preferably initially to 70° to 80° C. and gradually increasing to about 100° C. at the end of the reaction, in the presence of a solvent and under inert gas atmosphere, preferably nitrogen atmosphere. The aromatic carboxylic anhydride is most preferably 1,2,4-benzenetricarboxylic anhydride. suitable polyols are all polyols having 3 to 10 hydroxyl groups and the hydroxyl groups are preferably of equivalent reactivity, which means that the esterification of each hydroxyl group will proceed equally easy to start the building up of the regular molecule. Examples of such polyols are trimethylolpropane, pentaerythritol or a dimer thereof, mono- and disaccharides, with pentaerythritol as a preferred embodiment. The amount of added anhydride is at least one mole of anhydride per hydroxyl group of the polyol, but preferably the anhydride is added in an excess amount. An excess of 20–50 mol % is suitable. An activating agent is used to activate the anhydride group. The activating agent is present in a catalytic amount. The activating agent stannous chloride is a preferred embodiment. A suitable solvent is for example N,N-dimethylformamide (DMF).

Figure 2:
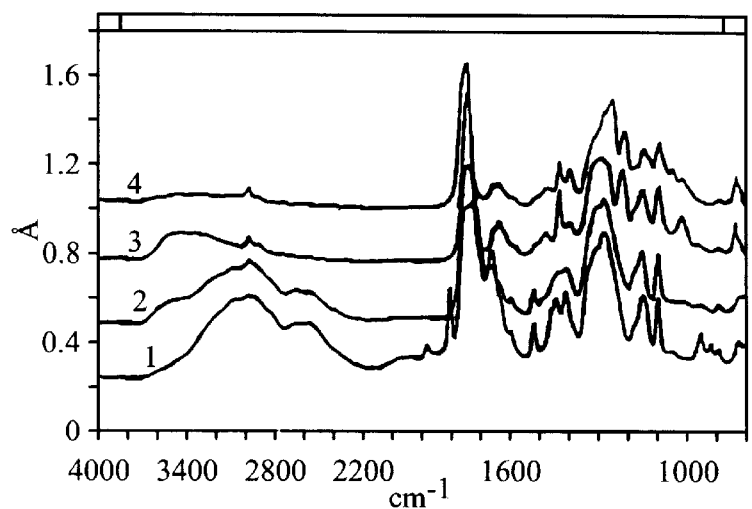
FIG. 2 depicts an IR spectra of the products at different stages.
Figure 3:
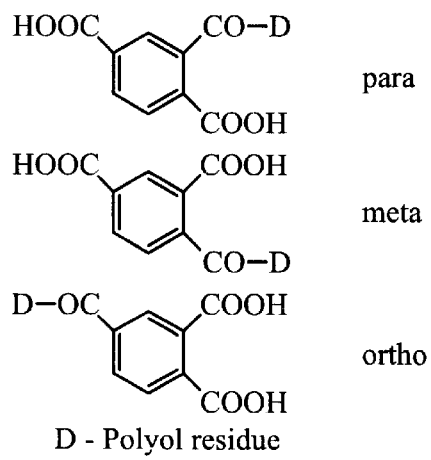
FIG. 3 depicts the molecular structure of the three polyester isomers.

For a product mixture of 1,2,4-benzenetricarboxylic anhydride with pentaerythritol the IR spectrum with residual 1,2,4-benzenetricarboxylic anhydride is shown by curve 1 in FIG. 2. Toluene was used to wash the reaction product to remove the excess of 1,2,4-benzenetricarboxylic anhydride until no peaks at 1760 and 1850 cm$^{-1}$ for anhydride groups could be observed, shown as curve 2 in FIG. 2. The wide absorption bands at the range of 2750 to 3400 cm$^{-1}$ in the IR spectrum indicate the terminal carboxyl groups on the benzene ring. For this product mixture each polyolester of the polycarboxylic acid anhydride has two carboxyl end groups. Three isomer products could be obtained in this system, and the molecular structures are shown in FIG. 3. The product is largely a mixture of meta and para isomers of the ester according to the relative reactivity of the anhydride and the carboxyl groups at low reaction temperature. A small amount of ortho isomer is expected to be a hydrolysis and reesterification product of para and meta polyolester formed. The reaction of carboxyl and hydroxyl groups is favoured at elevated temperatures.

Figure 4:
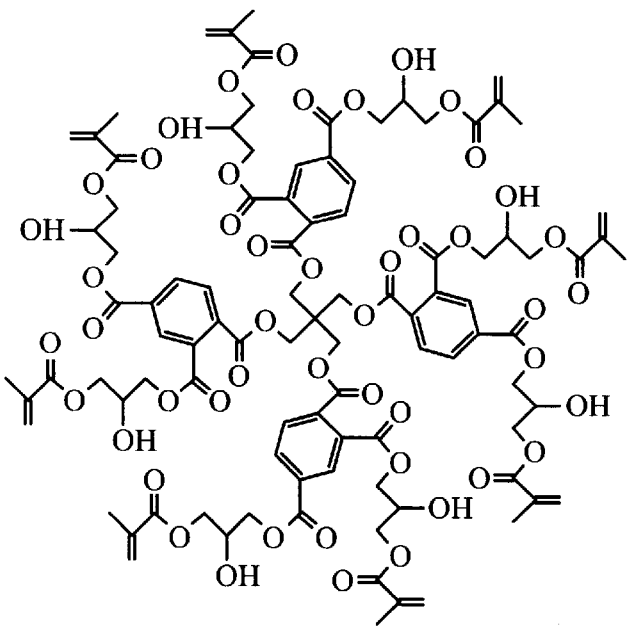
FIG. 4 depicts an idealized formula of the hyperbranched methacrylated polyester with 8 double bonds.

The polyolester was further reacted with glycidyl (meth) acrylate or allyl glycidyl ether in an amount at least corresponding to one mole of glycidyl (meth)acrylate or allyl glycidyl ether per free carboxylic acid group of the formed polyester, preferably in an excess amount, i.e. about 5 wt %. Glycidyl acrylate is the preferred reactant. The reaction is carried out in a solvent, such as a mixture of DMF and toluene in the presences of a basic catalyst and an inhibitor for radical polymerization until no carboxyl groups could be detected by end-group titration. As basic catalysts common bases can be used, but benzyl dimethyl amine is preferred. Conventional inhibitors such as hydroquinone is used. The reaction temperature is below 100° C., preferably about 70° C. The IR spectrum of the product is shown as curve 3 in FIG. 2. The appearance of the wide absorption at around 3460 cm$^{-1}$ means the formation of hydroxyl groups on the molecular chains due to reaction of epoxy and carboxyl groups. Finally, residual solvent was removed by evacuation at low temperature. The final "starburst" hyperbranched polyester products with double bonds at the end groups are translucent viscous liquids with one hydroxyl group at each end group. The molecular structure, when started with pentaerythritol, is ideally sphere-like, with about 8 end-double bonds. The principal formula is shown in FIG. 4.

Figure 5:
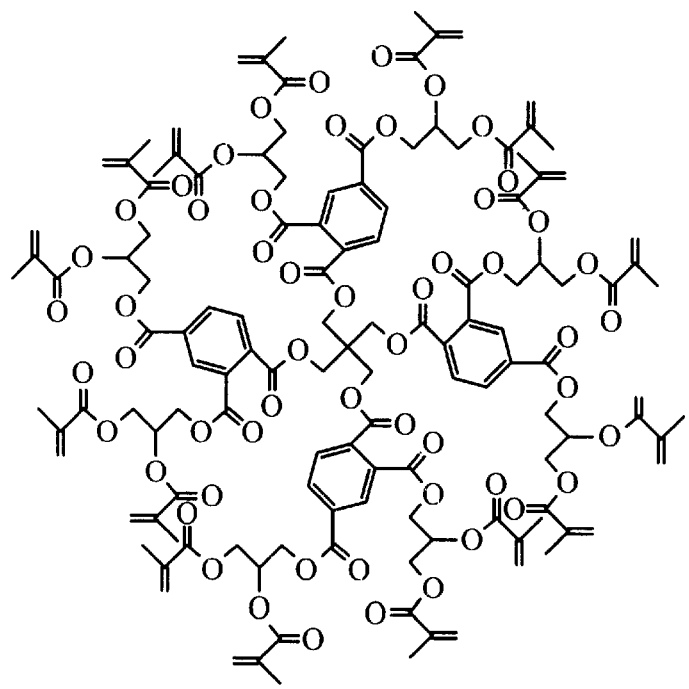
FIG. 5 depicts an idealized formula of the hyperbranched methacrylated polyester with 16 double bonds.

The hydroxyl groups of the hyperbranched polyester with terminal double bonds were reacted further by ester formation with (meth)acrylic anhydride in an amount sufficient to esterify a part of or all of the free hydroxyl groups in order to prepare the hyperbranched polyester molecules with further end-double bonds. Of the two acrylic anhydrides, the methacrylic anhydride is preferred. The hyperbranched polyester started from pentaerythritol with about 16 end-double bonds with the idealized formula is shown in FIG. 5. The IR spectrum of the hyperbranched polyester with about 16 double bonds is shown by curve 4 in FIG. 2. Almost no peak for hydroxyl group could be observed.

In a last step the product with end-double bonds is reacted with an aliphatic carboxylic anhydride, preferably acetic anhydride to esterify a part of or all of the remaining hydroxyl groups on the molecular chains for decreasing molecular polarity of the hyperbranched polyester, and improving its compatibility with multifunctional comonomers. This esterification can also be made of the hydroxyl groups of the hyperbranched polyester before the previous reaction with (meth)acrylic anhydride, thus omitting the further introduction of (meth)acrylic double bonds. The final hyperbranched polyester products with terminal double bonds after modifying, prepared in the present invention are fairly transparent colourless viscous liquids. As shown in FIGS. 4 and 5 the double bonds are in end groups, located at the surface of the oligomeric sphere, which is highly favourable for UV cure.

Figure 6:
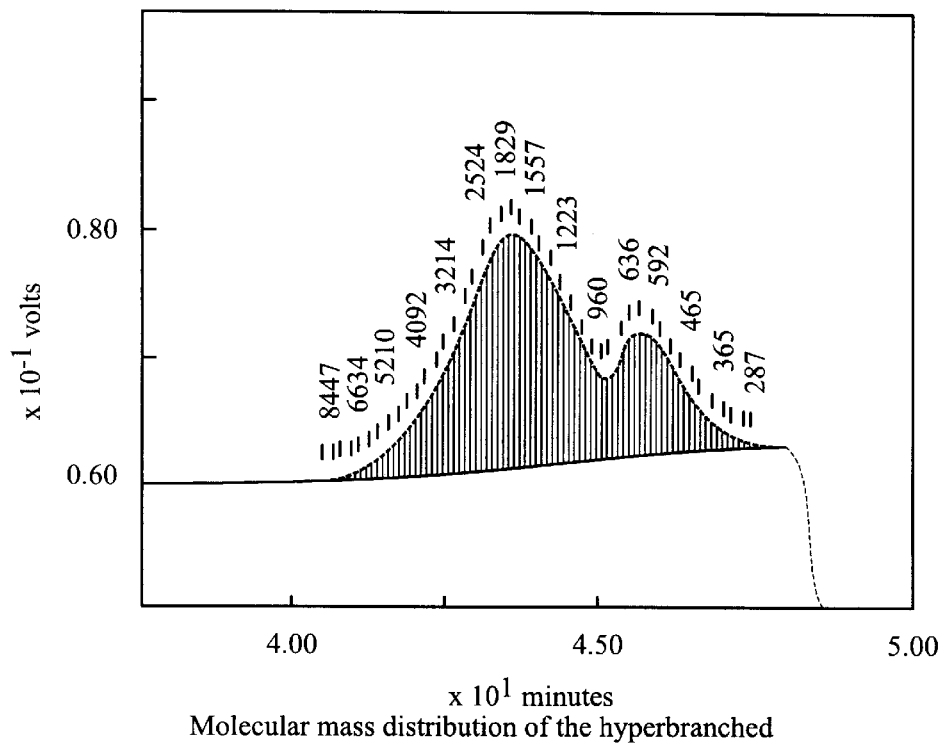
FIG. 6 depicts molecular mass distribution of the hyperbranched methacrylated polyester D-1 analyzed with GPC analysis.

The polydispersity measured by GPC analysis (FIG. 6) varied from 1,4 to 1,9 at different reactant ratios and reaction temperatures with molecular weights of maximum 2500 obtained, which corresponds to a modified polyester molecule with four main branches. The wide molecular weight distribution is mainly attributed to incomplete reaction between 1,2,4-benzenetricarboxylic anhydride and pentaerythritol, hyperbranched polyester fragmentation during hyperbranched polyester growth, and to the small excess of glycidyl (meth)acrylate monomer which react further with by-products in the system, responsive to UV irradiation.

The hyperbranched polyester according to the invention can be used as curable resins. The resins are preferably cured by UV or EB radiation and most preferably by UV radiation. The resins have lower viscosity than known oligomer resins and can be used without a comonomer or with lower amounts of comonomer than for conventional oligomer resins. The UV curing of the resin according to the invention is very rapid, down to parts of a second at room temperature operation. This means a high speed of cure and low energi consumption. The obtained products have a high glass transition temperature, resulting in products of high hardness, for example coatings or laminates with high surface hardness.

The resins are solvent free and can be prepared from 100% of the hyperbranched polyester according to the invention. The resins can however, also comprise multifunctional monomers. A suitable amount of comonomer is 5–20 wt % and the rest 80–95 wt % being the hyberbranched polyester. The resins preferably comprise a photofragmenting initiator. The amount of photofragmenting initiator used is in the range 1–5 wt % based on the resin. Conventional photofragmenting initiators can be used and a preferred initiator is benzoyl dimethylketol. As multifunctional monomers compounds with reactive double bonds can be used, such as trimethylolpropane tri(meth)acrylate, hexandiol diacrylate, trimethylolpropane triallylether, pentaerythritol tri/tetra-allylether, triallylcyanurate, trimethylolpropane triacrylether, pentaerythritol tetraacrylether. Trimethylolpropane triacrylate being a preferred embodiment.

The resin according to the invention can be used in many different fields of which could be mentioned coatings, adhesives, laminates, foils and thin films and fibre-reinforced composites.

The invention will now be illustrated with the following examples which however, are not intended to restrict the invention. with parts and percent are meant parts per weight and weight-%, if nothing else is mentioned.

The following chemicals are used:
Pentaerythritol [PETL]
1,2,4-Benzenetricarboxylic Anhydride [BTCA]
Glycidyl Acrylate [GA]
Methacrylic Anhydride [MAA]
Acetic Anhydride [AA]
Stannous Chloride [SC]
Benzyldimethylamine [BDMA]
Hydroquinone [HQ]
Dimethyl Formamide [DMF]
Trimethylolpropane Triacrylate (TMPTA)
Benzoyldimethylketol (BDK)

EXAMPLE 1

92.2 g (0.48 mol) BTCA is dissolved in 100 ml DMF at 80° C. 10.9 g (0.08 mol) PETL and 0.1 g (0.1 wt %) SC are added, and the solution is kept at 80° C. for 8 hours, and then heated to 100° C. for 10 hours under $N_2$. Most of DMF is distilled off in vacuum and toluene is poured into the product to dissolve the residual BTCA. The product is washed with toluene until no BTCA is detected in IR spectra (1760 and 1850 $cm^{-1}$ for anhydride groups). 57.2 g polyolester is obtained, as a white powder, with the yield of about 79% after completely removing the solvents. The acid number of 475 mg KOH/g polyester is determined by titration with 0.1N KOH. 65.09 g (0.508 mol with a 5% excess) GA is added slowly drop by drop at 70° C. together with 5 g (2.5%) BDMA as catalyst and 1000 ppm HQ as inhibitor, dissolved in 70 ml DMF. After 7 hours at 70° C. no carboxyl groups can be detected by titration. DMF is distilled off in vacuum. The product is a viscous liquid with maximum 8 acrylate and 8 hydroxyl groups per molecule. This product is called D-1OH.

12.4 g (0.121 mol) AA is added to 40.8 g D-1OH in 50 ml DMF which reacts with about 6 hydroxyl groups per molecule (averaged about 2 OH groups per molecule remain). The product solution is then heated for 2 hours at 70° C. and DMF is distilled off in vacuum. The obtained product, called D-1, is a viscous liquid with about 8 acrylate groups and 2 hydroxyl groups per molecule.

EXAMPLE 2

40.8 g D-1OH is dissolved in 50 ml DMF with 500 ppm HQ and 12.4 g (0.08 mol) MAA and 4.1 g (0.04 mol) AA are added slowly, drop by drop at 70° C. for two hours to react with the hydroxyl groups. DMF is removed by vacuum distillation. The product, called D-2, is a viscous liquid with about 12 (meth)acrylate groups and 2 hydroxyl groups per molecule.

EXAMPLE 3

40.8 g D-1OH is dissolved in 50 ml DMF with 500 ppm HQ as inhibitor. 24.8 g MAA (0.161 mol) is added and heated to 70° C. After 2 hours the reaction is complete. DMF is removed by vacuum distillation. The product, called D-3, is a viscous liquid with about 8 acrylate and 8 methacrylate groups per molecule.

Figure 7:
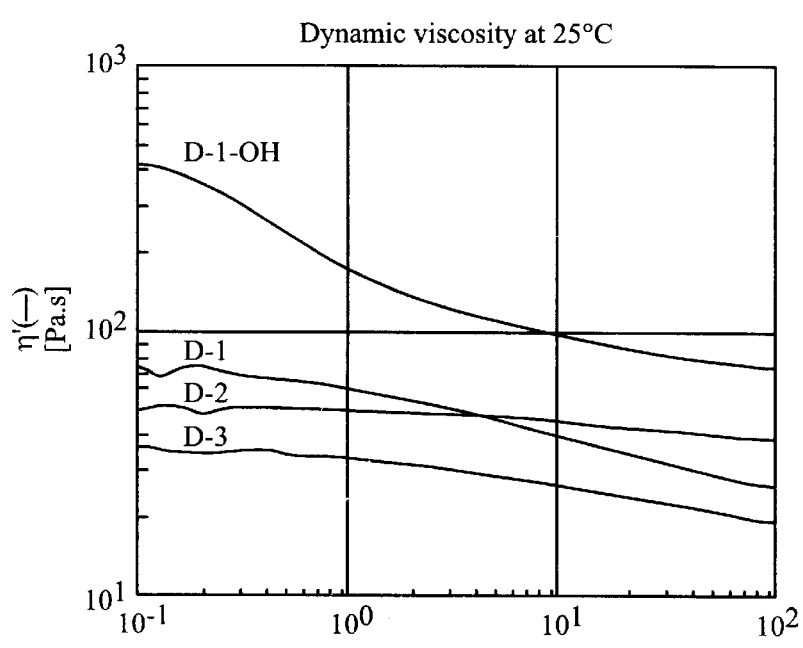
FIG. 7 depicts the dynamic, viscosity of the hyperbranched (meth)acrylated polyester.

The dynamic viscosity for the products from Examples 1 to 3 was measured as a function of frequency for the hyperbranched polyesters with different numbers of double bonds, as shown in FIG. 7. The hyperbranched polyester D-1OH, according to Example 1, with about 8 double bonds and without acetic anhydride modification, has the highest viscosity due to the many hydroxyl groups in the system, resulting in intermolecular hydrogen bonding (hyperbranched polyester aggregation). At decreasing hydroxy functionality, the dynamic viscosities of the hyperbranched polyester largely decrease in order of D-1, D-2 and D-3, according to Examples 1 to 3, at lower frequency. D-3 has the lowest viscosity compared with D-1 and D-2 because of the high number of double bonds (no remaining hydroxyl groups) at the surface of the spherical molecule. This results in increasing symmetry of the hyperbranched molecule, apart from less influence from the hydrogen bonding.

Low viscosity is particularly important in controlling the levelling time of a coating and for evaluation of the processability of a radiation curable coating and adhesive. This is especially the case for 100% solid coating systems for thin films. The oligomer is the principal constituent and primarily responsible for the basic properties of the coating. The viscosity of the oligomer is, therefore, an important parameter since it determines the amount of oligomer required in the final product. For control of the viscosity of the radiation curable resin there are only two parameters, namely the viscosity of the oligomer and the amount of comonomer added.

The principal rheological difference between the branched and the linear polyester molecules lies in the smaller spatial extension of the branched molecule at a given molecular mass. The viscosity of the resin is related to the dynamic extension in space and the segment density within the volume of the molecule. Therefore, the sphere-like starburst (meth)acrylated polyester according to the invention has lower viscosity than the linear polyester.

Figure 8:
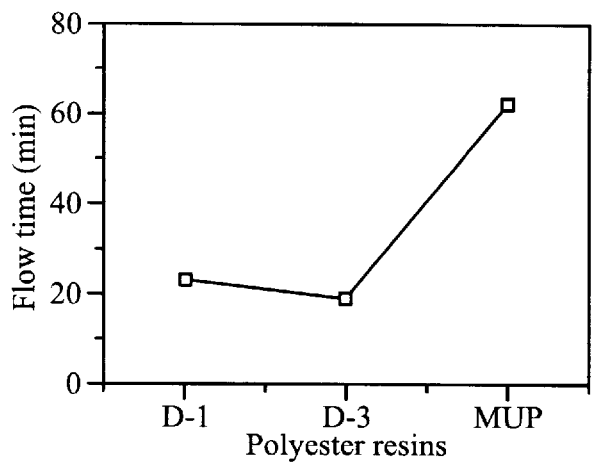
FIG. 8 depicts flow time of hyperbranched polyesters and MUP using viscometric cup.

Flow time measurements are another evaluation of the relative viscosity of various coatings and adhesives, using a viscosimetric cup. The viscosities of the hyperbranched (meth)acrylated polyesters containing 15 wt % trimethylolpropane triacrylate (TMPTA), as comonomer and a conventional epoxy acrylate modified unsaturated polyester (MUP) containing 35 wt % TMPTA at 21° C. are compared in FIG. 8. It can be seen that the flow times through the viscosimetric cup for hyperbranched polyester resins are much shorter than for MUP resin. This means that the viscosity of MUP is much higher than that of hyperbranched polyester. A practical consequence is that the processability of hyperbranched polyester containing resins is improved due to lower viscosity.

EXAMPLE 4

3 parts of BDK were dissolved in 100 parts of a mixture of 15% by weight of TMPTA and 85% by weight of D-1, D-2 or D-3, the resultant resins were coated on a polyethylene terephtalate (PET) sheet. The test samples were cured in air on a conveyer belt with variable speed by UV irradiation for 0,15 seconds under a 300 W/in (120 W/cm) Model F300 D bulb (Fusion UV Curing Systems) in the exposure chamber.

EXAMPLE 5

The procedure of Example 4 was repeated except that 100 parts of D-1, D-2 or D-3 polyesters are used instead of the mixture of the polyesters and TMPTA.

Figure 9:
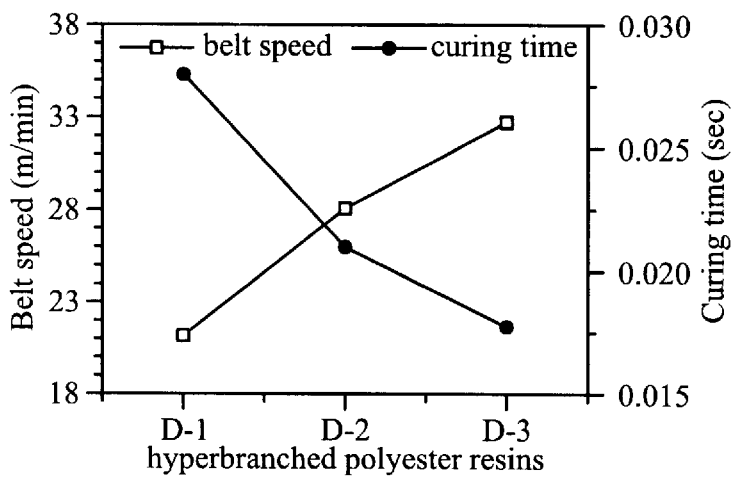
FIG. 9 depicts curing time and belt speed to tack-free state for UV cured polyester films.

The irradiation time is varied by changing the speed of the conveyor belt. The polymerization rate of the hyperbranched polyester resins was determined by measuring the irradiation time required to obtain fully tack-free state for the cured film using a cotton bar. The data are given in FIG. 9. The resin with oligomer D-3 needs the shortest curing time to get tack-free state.

Figure 10:
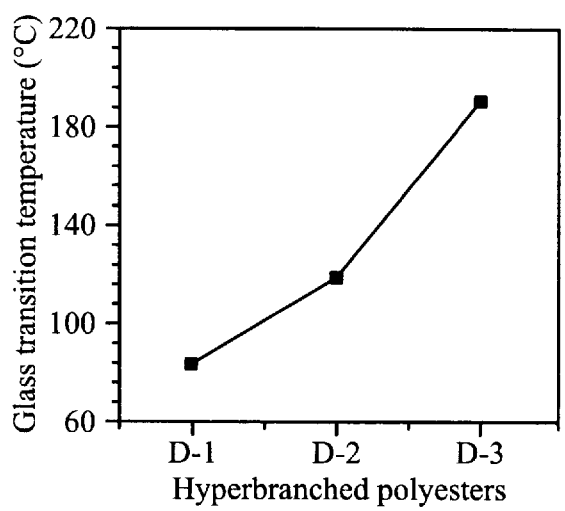
FIG. 10 depicts glass transition temperatures of the cured hyperbranched polyesters.

The glass transition temperatures of the crosslinked (meth)acrylated hyperbranched polyesters D-1, D-2 and D-3 according to Example 5 from Dynamic Mechanical Thermal Analysis (DMTA) measurements are given in FIG. 10. It can be seen that the glass transition temperature increases rapidly with increasing functionality of the cured hyperbranched oligomer.

The physical properties of the cured material are related to the structure of the crosslinked network. The glass transition temperature, $T_g$, is a function of the flexibility of the polymeric chains. If the flexibility decreases, the transition temperature increases. Flexibility is a function of chain structure, crosslinked structure and crosslink density. For the hyperbranched polyesters the spherical shape of the molecules and the high crosslink density due to its high functionality decreases the flexibility of the cured films. Therefore, crosslinked hyperbranched polyester give higher glass transition temperature than crosslinked linear oligomers as an effect of the structural difference.

The measurements made in the present invention were performed accordingly:

Molecular Weight Distribution

Measurements of molecular weight distribution were performed on a WATERS 410 GPC system equipped with a WISP 712 automated injector. The columns used were $\mu$-Styragel of pore sized: 500, $10^5$, $10^4$, $10^3$, and 100 Ångström with polystyrene standards for calibration and tetrahydrofuran (THF) as solvent.

Dynamic Mechanical Spectroscopy

The dynamic mechanical properties of the hyperbranched polyesters were measured by shear rheometry (Dynamic Analyser RDAII). Viscous liquid samples were examined at 25° C. using two parallel plates of 12.5 mm radius with 0.62 to 0.76 $\mu$m gap over a wide range of frequencies.

Flow Time

Flow time of the resins with multifunctional monomer added was measured using a viscometric cup of number 68 for comparison of the viscosity of the hyperbranched polyesters with that of modified linear unsaturated polyester.

IR spectra

Infra-red spectra of the polyesters at different reaction stages were recorded on a Perkin-Elmer Model 1710 Fourier Transform Spectrometer prepared as pressed KBr solid disk or smeared as an acetone solution of the resin on a NaCl prism to form a thin film.

Thermomechanical analysis

Dynamic Mechanical Thermal Analyser (DMTA, Polymer Laboratories MK II) was used to measure glass transition temperature ($T_g$) at the range of 40° to 250° C. and 1 Hz frequency of completely UV cured films without TMPTA added.

We claim:

1. Hyperbranched polyester of a polyol with 3 to 10 reactive hydroxyl groups, and an aromatic polycarboxylic anhydride with 2 to 4 carboxyl groups, each hydroxyl group of the polyol forming an ester linkage with one anhydride group of the polycarboxylic anhydride, and further glycidyl (meth)acrylate or allyl glycidyl ether forming ester linkages with the remaining carboxyl groups of the anhydride and free hydroxyl groups.

2. Hyperbranched polyester of a polyol with 3 to 10 reactive hydroxyl groups and an aromatic polycarboxylic anhydride with 2 to 4 carboxyl groups, each hydroxyl group of the polyol forming an ester linkage with one anhydride group of the polycarboxylic anhydride, and glycidyl (meth)acrylate or allyl glycidyl ether forming ester linkages with the remaining carboxyl groups of the anhydride and free hydroxyl groups, and further an anhydride selected from the group consisting of a (meth)acrylic anhydride, an aliphatic carboxylic anhydride, and blends thereof, forming ester linkages with the free hydroxyl groups.

3. Hyperbranched polyester produced by a process comprising the following steps:

a) reacting an aromatic polycarboxylic anhydride with 2 to 4 carboxyl groups with a polyol with 3 to 10 reactive hydroxyl groups in the presence of an activating agent, the amount of anhydride being at least one mole of anhydride per hydroxyl group in the polyol, b) reacting the product from a) with glycidyl (meth) acrylate or allyl glycidyl ether in an amount at least corresponding to one mole of glycidyl (meth)acrylate or allyl glycidyl ether per free carboxylic acid group of the product of a).

4. The hyperbranched polyester according to claim 3, wherein the activating agent is present in a catalytic amount.

5. The hyperbranched polyester according to claim 3, wherein the activating agent is $SnCl_2$.

6. The hyperbranched polyester of claim 3, the process further comprising c) reacting the product from step b) with (meth)acrylic anhydride in an amount sufficient to esterify at least a part of the free hydroxyl groups of the product from step b).

7. The hyperbranched polyester of claim 3, the process further comprising c) reacting the product from step b) with an aliphatic carboxylic anhydride in an amount sufficient to esterify at least a part of the remaining hydroxyl groups of the product.

8. The hyperbranched polyester of claim 1 wherein the reactive hydroxyl groups of the polyol have equivalent reactivity and the aromatic polycarboxylic anhydride has three carboxyl groups.

9. The hyperbranched polyester of claim 2 wherein the reactive hydroxyl groups of the polyol have equivalent reactivity and the aromatic polycarboxylic anhydride has three carboxyl groups.

10. The hyperbranched polyester of claim 3 wherein the reactive hydroxyl groups of the polyol have equivalent reactivity and the aromatic polycarboxylic anhydride has three carboxyl groups.

11. The hyperbranched polyester of claim 6, the process further comprising reacting the product from step c) with an aliphatic carboxylic anhydride in an amount sufficient to esterify at least a part of the remaining hydroxyl groups of the product.

12. The process of claim 11, wherein the aromatic polycarboxylic anhydride has three carboxyl groups and the reactive hydroxyl groups of the polyol have equivalent reactivity.

13. The process according to claim 12, further comprising the following step:

c) reacting the product from step b) with (meth)acrylic anhydride in an amount sufficiently to esterify at least a part of the free hydroxyl groups of the product from step b).

14. The hyperbranched polyester according to any one of claims 2, 6, 7, 9, or 11, wherein the (meth)acrylic anhydride is (meth)acrylic anhydride and the aliphatic carboxylic anhydride forming ester linkages with the free hydroxyl groups in acetic anhydride.

15. The hyperbranched polyester according to any one of claims 1 to 7, wherein the polyol is pentaerythritol and the aromatic polycarboxylic anhydride is 1,2,4-benzenetricarboxylic anhydride and the glycidyl (meth)acrylate is glycidyl acrylate.

16. The hyperbranched polyester according to any one of claims 1, 2, 3, 4, 5, 6, 7, 8, 9, 10 or 11, wherein the hyperbranched polyester is a dendritic polyester or a crosslinked dendritic polyester.

17. A process for the production of a hyperbranched polyester, said process comprising the steps of:

a) reacting an aromatic polycarboxylic anhydride with 2 to 4 carboxyl groups with a polyol with 3 to 10 reactive hydroxyl groups in the presence of an activating agent, the amount of anhydride being at least one mole of anhydride per hydroxyl group in the polyol, b) reacting the product from a) with glycidyl (meth) acrylate or allyl glycidyl ether in an amount at least corresponding to one mole of glycidyl (meth)acrylate or allyl glycidyl ether per free carboxylic acid group of the product of a).

18. The process according to claim 17, wherein the activating agent is present in a catalytic amount.

19. The process according to claim 17, wherein the activating agent is $SnCl_2$.

20. The process according to claim 17, wherein the reaction mixture of step a) is heated to a temperature below 100° C.

21. The process according to claim 17, wherein the amount of anhydride in step a) is at least 1.2 moles per hydroxyl group and the amount of glycidyl (meth)acrylate or allyl glycidyl ether in step b) is at least 1.05 moles per free carboxylic acid group.

22. The process according to claim 17, wherein the reaction of step b) is carried out in the presence of a basic catalyst and an inhibitor for radical polymerization.

23. The process according to claim 22, wherein the basic catalyst is benzyldimethyldiamine.

24. The process according to claim 17, further comprising the following step:

c) reacting the product from step b) with (meth)acrylic anhydride in an amount sufficient to esterify at least a part of the free hydroxyl groups of the product from step b).

25. The process according to claim 24, wherein the anhydride is methacrylic anhydride.

26. The process according to any one of claims 17, 24, 12, or 13, further comprising reacting the product from step b) or c) with an aliphatic carboxylic anhydride in an amount sufficient to esterify at least a part of the remaining hydroxyl groups of the product.

27. The process according to claim 26, wherein the aliphatic carboxylic anhydride is acetic anhydride.

28. The process according to any one of claims 17 to 25, wherein the polyol is pentaerythritol and the aromatic polycarboxylic anhydride is 1,2,4-benzene-tricarboxylic anhydride and the glycidyl (meth)acrylate is glycidyl acrylate.

29. The process according to any one of claims 17 to 25, wherein the hyperbranched polyester is a dendritic polyester or a crosslinked dendritic polyester.

30. The curable resin comprising the hyperbranched polyester of any one of claims 1 to 7.

31. The curable resin according to claim 30, further comprising a photofragmenting initiator.

32. The curable resin according to claim 31, further comprising a multifunctional monomer.

33. The curable resin according to claim 32 wherein the multifunctional monomer is trimethylolpropane triacrylate.

34. The curable resin according to claim 30 wherein the resin is curable with UV irradiation.

35. The process according to claim 12, wherein the activating agent is present in a catalytic amount.

36. The process according to claim 12, wherein the activating agent is $SnCl_2$.

37. The process according to claim 12, wherein the reaction mixture of step a) is heated to a temperature below 100° C.

38. The process according to claim 12, wherein the amount of anhydride in step a) is at least 1.2 moles per hydroxyl group and the amount of glycidyl (meth)acrylate or allyl glycidyl ether in step b) is at least 1.05 moles per free carboxylic acid group.

39. The process according to claim 12, wherein the reaction of step b) is carried out in the presence of a basic catalyst and an inhibitor for radical polymerization.

40. The process according to claim 39, wherein the basic catalyst is benzyldimethyldiamine.

41. The process according to claim 13, wherein the anhydride is methacrylic anhydride.

42. A coating, adhesive, laminate, foil, thin film, or fiber-reinforced composite comprising a cured product of the curable resin of claim 30.

* * * * *